Oct. 18, 1960 R. L. LICH 2,956,515
RAILWAY VEHICLE TRUCK STEERING STRUCTURE
Filed Oct. 25, 1956 2 Sheets-Sheet 1

INVENTOR.
RICHARD L. LICH
BY Rodney Bedell
ATTORNEY

Oct. 18, 1960  R. L. LICH  2,956,515
RAILWAY VEHICLE TRUCK STEERING STRUCTURE
Filed Oct. 25, 1956  2 Sheets-Sheet 2

INVENTOR.
RICHARD L. LICH
BY Rodney Bedell
ATTORNEY

United States Patent Office 2,956,515
Patented Oct. 18, 1960

2,956,515

RAILWAY VEHICLE TRUCK STEERING STRUCTURE

Richard L. Lich, Ferguson, Mo., assignor to General Steel Castings Corporation, Granite City, Ill., a corporation of Delaware Filed Oct. 25, 1956, Ser. No. 618,388

9 Claims. (Cl. 105—4)

The invention relates to railway rolling stock and more particularly to articulated car structure and consists in structure for holding a truck in assembled relation with one vehicle body overlying the truck and for steering the truck by the angling of the vehicle body and an associated vehicle body. The invention is particularly adapted for use in articulated car structure in which a two-wheel truck supports each end of a middle car and the adjacent ends of an adjacent car body. In some respects the invention is an improvement on features disclosed in a co-pending application by the same inventor, filed June 6, 1955, Serial No. 513,234.

One object of the invention is to simplify truck and body assembly structure in articulated car arrangements as described.

Another object is to effect swiveling of the truck on the directly-supported car body in accordance with the angling of the adjacent car.

Another object is to position the truck longitudinally of the body directly mounted thereon independently of the truck steering structure.

Another object is to effectively actuate the steering mechanism independently of variations in the vehicle body load on the truck due to static weight or spring load variations.

These and other detail objects are attained by the structure illustrated in the accompanying drawings, in which.

Figure 1:
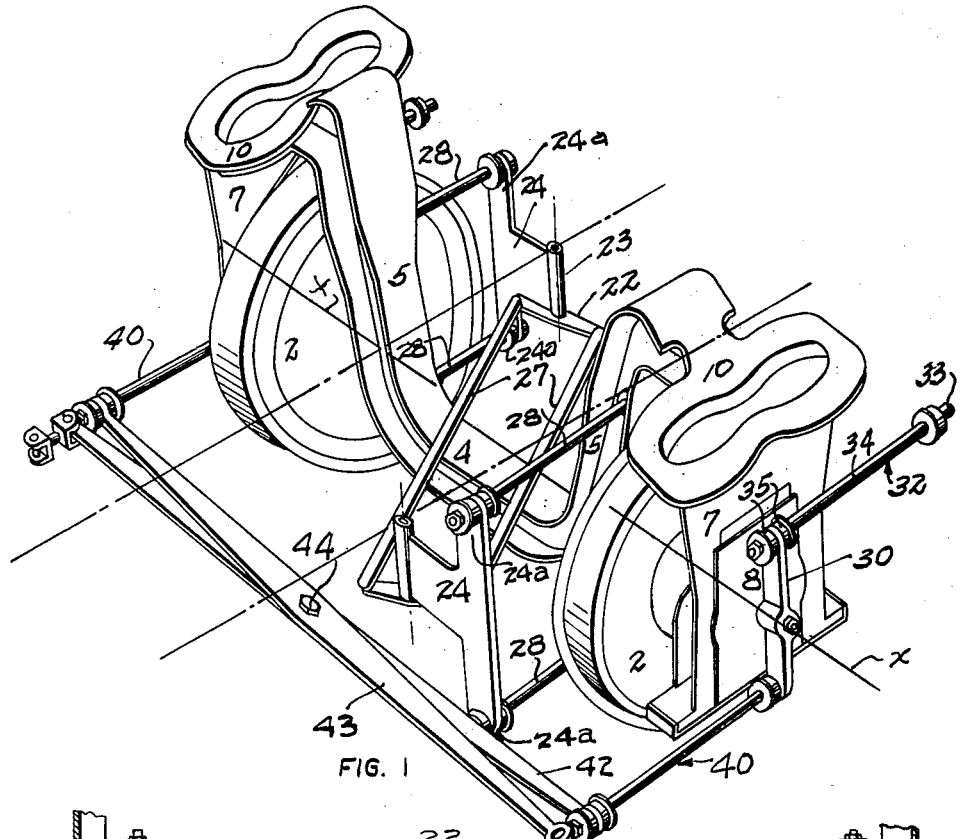
Figure 1 is a perspective, in part diagrammatical, of a two-wheel truck adapted to support one end of a car body and provided with elements for connection to the overlying car body for accommodating swiveling action of the truck on the car body and for partial steering control of the truck as it swivels.
Figure 2:
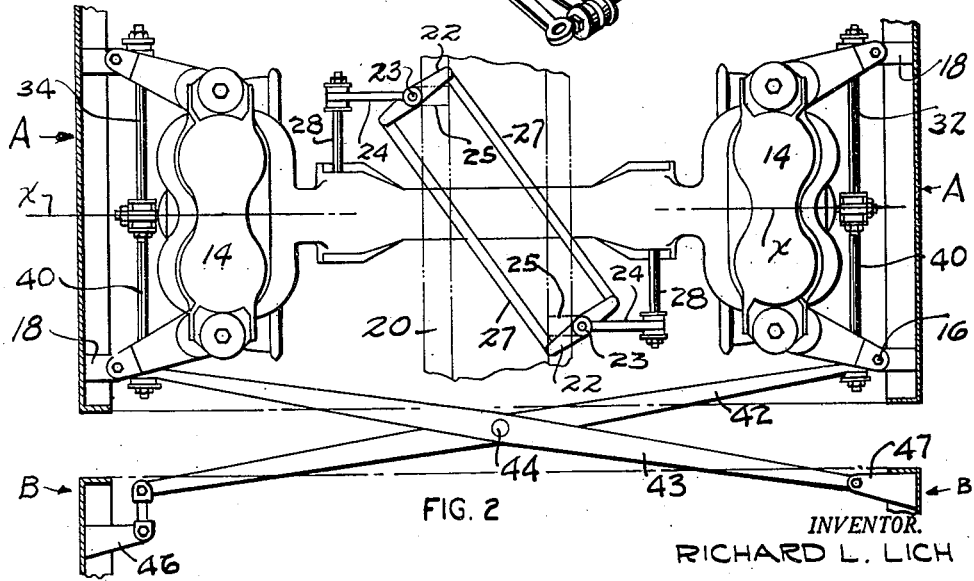
Figure 2 is a top view of the truck shown in Figure 1, showing portions of the car body mounted directly thereon and portions of the adjacent car.
Figure 3:
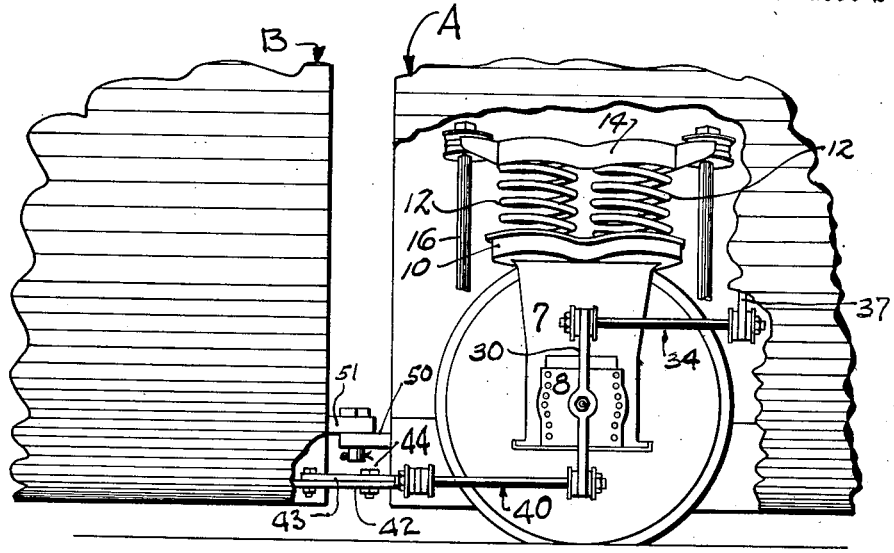
Figure 3 is a side elevation of the structure shown in Figure 2.

The truck shown in Figures 1, 2 and 3 has two wheels 2 mounted on stub axles, indicated diagrammatically at X. A truck frame has a transverse low level middle portion 4 merging at each end with one leg 5 of an upstanding inverted U-shaped portion provided with an outer leg 7, there being a high level base portion forming a seat 10 for the truck springs 12 (Figure 3).

Stub axles X are journaled in frame portions 5 and 7, or in separately formed journal boxes 8 secured to these frame portions and, in effect, part of the frame. A spring cap 14 is carried on springs 12 and links 16 are suspended from opposite ends of cap 14 and at their lower ends are connected to brackets 18 on the vehicle body A and thereby support the car body so that it may move transversely of the truck to absorb transverse thrust due to the wheel flanges engaging the rail heads, particularly on curved track.

The car body includes a center sill 20 (Figure 2). A horizontal lever at each side of the center sill includes an upright sleeve portion 23 (Figure 1), fulcrumed to a bracket 25 (Figure 2) on the center sill, an elongated portion 22, comprising arms extending laterally in opposite directions from sleeve 23, and a third arm in the form of a vertical web 24 extending laterally from sleeve 23 toward the adjacent side of the truck. Elements 22, 23, 24 are rigid with each other. One lever is positioned forwardly of the axis of the stub axles X. The other lever is disposed rearwardly of the axis of the stub axles X. Parallel links 27 extend diagonally of and beneath the center sill and are pivotally connected at their ends to the ends of the arms formed by lever portions 22. Vertically spaced anchors 28 connect brackets 24a directly to the upstanding portions 5 of the truck frame. Elements 22, 23, 24, 24a, 25 correspond to similar parts of the two-wheel truck shown in the above mentioned co-pending application, and hold the truck and body against relative movement lengthwise of the vehicle while accommodating their relative swiveling movement and transverse movement and vertical movement.

An upright lever 30 is pivoted intermediate its ends on each outer journal box 8 and its upper end is directly connected to car body A by a horizontal anchor 32. The anchor comprises a central bolt 33 surrounded by a sleeve 34 forming a strut between the elements to which the anchor is attached. Rubber pads 35 at opposite sides of the lever 30, or of the car body bracket 37 to which the other end of the anchor is attached, permit the parts connected by the anchor to angle relative to each other but the anchor prevents substantial movement of the parts to which it is connected in a direction lengthwise of the anchor. This type of anchor is in common use in railway structures.

The lower end of each lever 30 is connected by an anchor 40, similar to anchor 32, to one end of a horizontal bar 42, 43 extending transversely of the truck. These bars cross each other and are pivotally connected intermediate their ends by a vertical pin 44. The other ends of bars 42, 43 are connected to brackets 46, 47 respectively on an adjacent car body B. Car bodies A and B have overlapping tongues 50, 51 respectively pivoted to each other and by which body A and the truck shown supports body B.

A similar truck and associated parts at the other end of body A completes the three body articulated unit. The outer ends of bodies B are mounted on individual swiveling trucks which do not require steering mechanism.

With this construction, any angling of the car bodies relative to each other will be accompanied by an increase in the angle between the sides of the V formed by bars 42, 43 at one side of the structure and by a decrease in the angle between the bars at the other side of the structure. This pivoting of the bars about pin 44 will result in the movement of one anchor 40 toward corresponding truck frame and of the other anchor 40 away from the truck frame. Since the upper ends of levers 30 are held against movement lengthwise of car body A, the result of the movement of anchors 40 will be to swivel the truck frame through journal boxes 8, relative to the car body, the amount of such swiveling being one half the amount of angling between the car bodies.

Figure 4:
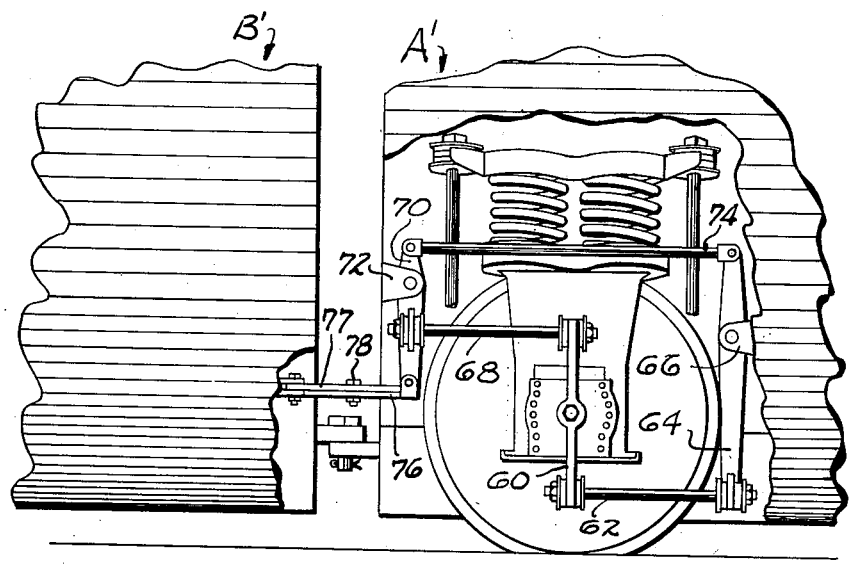
Figure 4 is a similar elevation illustrating a modified construction.

Figure 4 shows another arrangement in which the truck structure corresponds to that previously described, but the steering mechanism differs in detail but not in principle. The lower arm of each upright lever 60 fulcrumed on the journal box or truck frame is connected by an anchor 62 to the lower arm of a rear upright mounting lever 64 pivoted to a bracket 66 on the vehicle body A'. The upper arm of each lever 60 is connected by an anchor 68 to an arm of a forward mounting lever 70 pivoted to a bracket 72 on the body A'. A rod 74 connects the upper arms of levers 64, 70. The lower arms of levers 70 are connected to the ends of individual cross bars 76, 77 pivoted to each other at 78 and functioning as do the corresponding cross bars 42, 43 previously described.

With this arrangement the whole steering system is suspended from vehicle body A' irrespective of attachment to body B'. The parts at one side of the body are not dependent upon the cross bar connection to the other vehicle body for their support. The cross bars may be detached from either car and will be supported by their attachment to the other body.

The steering mechanism may be varied otherwise without departing from the spirit of the invention and the exclusive use of those modifications coming within the scope of the claims is contemplated.

What is claimed is:

1. A railway vehicle truck having a single pair of wheels, a truck frame supported thereby and including means holding the wheels against movement relative to the truck frame lengthwise of the truck, individual upright levers at the sides of the truck fulcrumed on said frame to swing lengthwise of the truck, linkage secured to one arm of each lever for connecting the same to a vehicle body overlying and mounted on the truck, and a pair of bars extending transversely of the truck and pivoted to each other intermediate their ends with one end of each transverse bar connected to the other arm of the adjacent upright lever, and the other end of each horizontal bar provided with a device for connection to a second vehicle body adjacent to the truck.

2. In combination, a railway vehicle truck, comprising a single pair of wheels with axle journals and a truck frame mounted on said journals, a vehicle body overlying and spring-supported on said frame, means holding the truck and body against relative movement lengthwise of the body while accommodating the swiveling of the truck on the body, and steering means for the truck to control the swiveling movement of the truck, comprising an upright lever at each side of the truck and pivoted intermediate its ends to the truck frame, a link connecting one arm of each lever to the vehicle body overlying the truck, a pair of bars extending from side to side of the vehicle forwardly of the truck and crossing each other and having a vertical pivot connection intermediate their ends, a link connecting the other arm of each upright lever to one end of a respective one of said horizontal bars, and means for connecting the other end of each transverse bar to the adjacent vehicle body.

3. A steering mechanism for a railway vehicle two-wheel truck with axle boxes, comprising a lever at each side of the truck pivoted to the box to swing in an upright plane lengthwise of the truck, a pair of bars extending transversely of the truck and pivoted together intermediate their ends to swing in a horizontal plane lengthwise of the truck, linkage connecting one end of each of said bars to one end of the adjacent journal box levers, linkage for connecting the other end of each journal box lever to a vehicle body overlying the truck, and means for connecting the other end of each of said bars to an adjacent vehicle.

4. A railway truck including a frame with a main low level transverse member terminating at each end in an inverted U-shape part with upright portions, wheels between associated upright portions, each having a stub shaft with its ends journaled in boxes secured in the upright portions, and upright lever pivoted between its ends to each outer journal box, an anchor extending from the upper end of each lever in one direction lengthwise of the truck for attachment to a vehicle body overlying and supported on the truck, an anchor extending from the lower end of each lever in the opposite direction, a pair of bars extending transversely of the truck and crossing each other intermediate their ends, a vertical pivot pin between the bars at their crossing, one end of each cross bar being linked to the end of one of the latter mentioned anchors remote from the journal box, and the other end of each cross bar having an element for connection to an adjacent vehicle body normally aligned with the vehicle body overlying the truck.

5. In combination, a railway vehicle truck, comprising a single pair of wheels with axle journals and a truck frame mounted on said journals, a vehicle body overlying and spring-supported on said frame, means holding the truck and body against relative movement lengthwise of the body while accommodating the swiveling of the truck on the body, and steering means for the truck to control the swiveling movement of the truck, comprising an upright lever at each side of the truck and pivoted intermediate its ends to the truck frame, upright mounting levers pivoted to the vehicle body forwardly and rearwardly of the corresponding first mentioned lever, a connection rod between the upper arms of said mounting levers at each side of the truck, a connection between the lower arm of each mounting lever and a respective arm of the first mentioned lever, and elongated bars extending transversely of the truck and pivoted to each other intermediate their ends to swing horizontally, each bar having one end connected to an individual one of the mounting levers and its other end arranged for pivotal connection directly to another car body.

6. In combination, a railway vehicle body and a two-wheel swiveling truck supporting the same, and a truck steering mechanism comprising an upright lever pivoted intermediate its ends to the truck to swing lengthwise of the vehicle, anchors secured to the arms of said lever and extending forwardly and rearwardly respectively of the vehicle, individual mounting levers fulcrumed to the vehicle body adjacent to the outer ends of said anchors and each having a connection at one side of its fulcrum to the corresponding anchor, a connection rod between said mounting levers at the other sides of their fulcrums, and a linkage for connecting the other end of one of said mounting levers and the adjacent portion of another vehicle body for swinging said latter mentioned mounting lever on its fulcrum as the car bodies angle relative to each other and thereby shifting said anchors and the adjacent side of the truck relative to the car body supported thereon.

7. In combination, a railway vehicle body including a center sill, a truck including a frame with a low level portion extending transversely of and below said center sill and with upstanding portions at the sides of the center sill forming spring seats beneath the sides of the body, springs thereon supporting the body, a lever having three arms rigid with each other fulcrumed on each side of the center sill to swing horizontally, and having one arm provided with vertically spaced terminals anchored to the corresponding upstanding portions of the truck frame and holding the frame against overturning, the other two arms of the lever extending horizontally transversely of the first mentioned arm, links extending from the outer ends of said latter mentioned arms diagonally beneath the center sill to the corresponding portions of the lever at the other side of the center sill, said levers and links holding the truck against bodily movement lengthwise of the vehicle body and preventing overturning of the truck frame, an upright lever culcrumed to each end of the truck frame to swing lengthwise of the vehicle with one end anchored to the vehicle body, a pair of bars extending from side to side of the truck and crossing each other intermediate their ends and pivoted together to swing horizontally, a connection between one end of each of said bars and the other end of one of said levers fulcrumed on the truck frame, and means for connecting the other end of each cross bar to another vehicle body, said cross bars, frame fulcrumed levers and connections and vehicle body connections swiveling the truck on the first mentioned vehicle body in accordance with the angling of the latter relative to the other body.

8. In combination with a pair of articulated railway vehicle bodies having a pivoted connection to each other at adjacent ends by which one vehicle supports the other, a swivel truck beneath and supporting the corresponding end of the supporting vehicle and including a truck frame extending from side to side of the vehicle, said truck frame having levers at opposite sides of the truck fulcrumed on the truck to swing in vertical planes extending lengthwise of the vehicle, a pair of bars extending from side to side of the truck between the truck and the more remote vehicle body, said bars crossing each other intermediate their ends and having a vertical pivotal connection to each other, one end of each bar being pivotally connected to one side of the more remote vehicle body, each of said levers having one arm pivotally connected to the same side of the vehicle body directly supported on the truck and having another arm pivotally connected to the other end of one of the cross bars, whereby angling of the vehicle bodies will swing the truck relative to both bodies.

9. In combination, a pair of railway vehicle bodies disposed end to end, a single two-wheel truck having a direct support for the end of one of said bodies, the adjacent end of the other of said bodies being supported upon the first-mentioned body, the truck comprising two wheels at opposite sides of the truck with axle journals and journal boxes, a rigid truck frame extending lengthwise of the common axis of said wheels and journals, spring units seated on said frame at the sides of the truck and constituting said direct support, means fixedly positioning the truck frame lengthwise of the directly supported vehicle body while permitting swiveling of the truck about a vertical pivot on the body comprising a rigid lever at each side of the truck having an elongated portion extending horizontally and diagonally of said axis, an arm extending at an angle to said elongated portion and intersecting the same, said arm extending substantially transversely of the length of the directly supported body, there being a vertical fulcrum on the directly supported body substantially at the intersection of and connected to said arm and elongated portion, one of said levers being forwardly of said axis and the other of said levers being rearwardly of said axis, a pair of elongated parallel links extending substantially diagonally of said axis and spaced apart horizontally and pivotally connected at their opposite ends to the opposite ends of said lever elongated portions and forming therewith a parallelogram, elongated anchors extending lengthwise of the assembly and connecting the outer ends of said lever elongated portion to adjacent sides of the truck frame, steering means for the truck comprising elongated bars extending substantially horizontally transversely of the truck and pivoted to each other intermediate their ends, each bar having a connection between one end of the bar and an individual side of the truck, and having a connection between the other end of the bar directly to the adjacent vehicle body independently of the support of the latter, said bar end connections providing for angling of the bars horizontally relative to said truck frame and to the adjacent vehicle body, said steering means maintaining equal angles between said axle and the longitudinal center lines of the two vehicle bodies throughout variations in the inclination horizontally of said vehicle body center lines to each other.

References Cited in the file of this patent

UNITED STATES PATENTS

| | | |
|---|---|---|
| 2,746,399 | Tomas | May 22, 1956 |
| 2,884,869 | Haug | May 5, 1959 |